Dec. 22, 1970     D. W. STRATTON     3,548,442
WINDSHIELD WIPER ARM CONSTRUCTION
Filed April 25, 1968
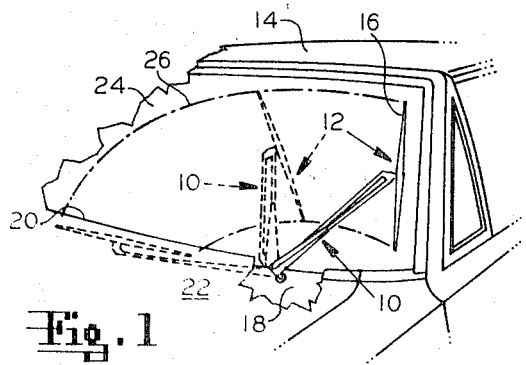
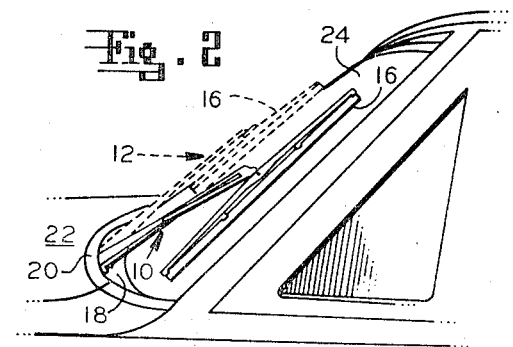
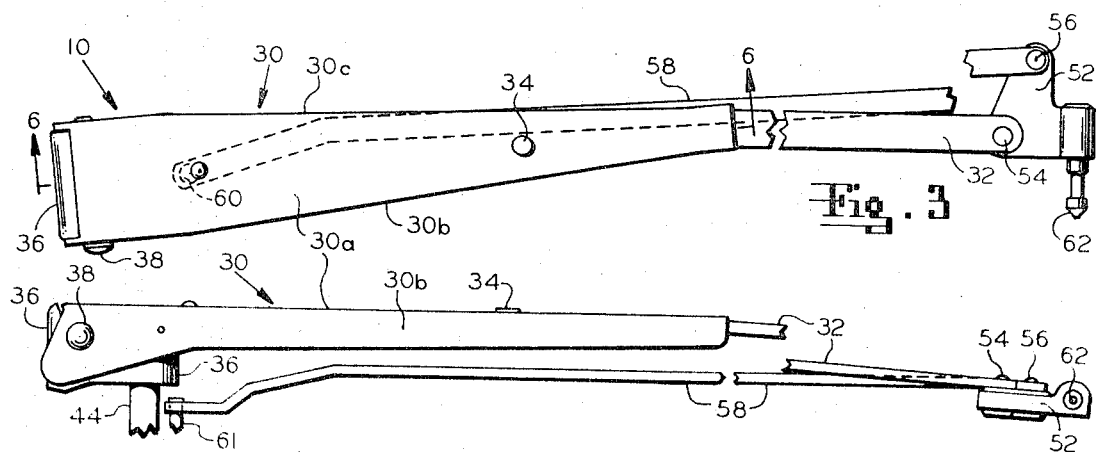
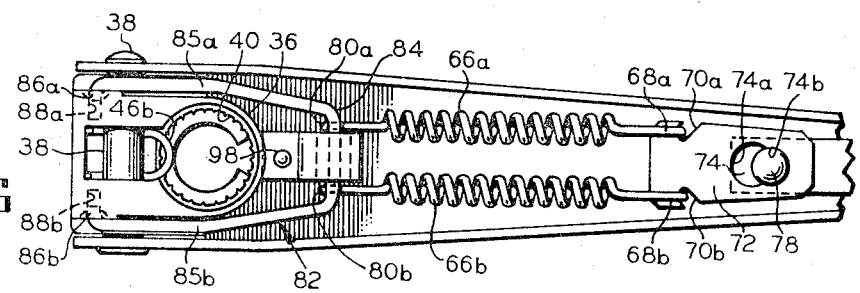
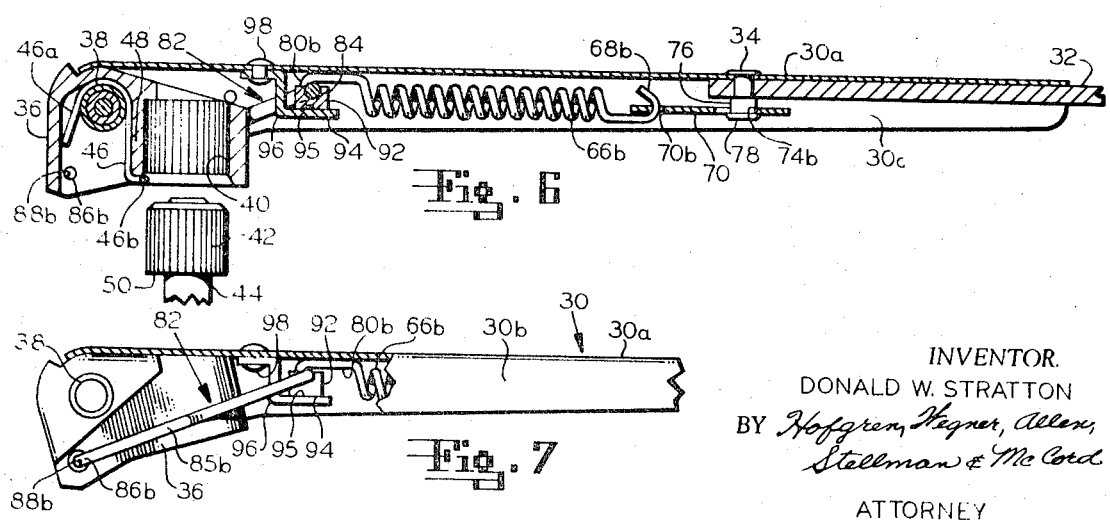
INVENTOR.
DONALD W. STRATTON
BY Hofgren, Wegner, Allen,
Stellman & McCord
ATTORNEY

United States Patent Office 3,548,442
Patented Dec. 22, 1970

3,548,442
WINDSHIELD WIPER ARM CONSTRUCTION
Donald W. Stratton, Hammond, Ind., assignor to The Anderson Company, a corporation of Indiana
Filed Apr. 25, 1968, Ser. No. 724,139
Int. Cl. B60s 1/34
U.S. Cl. 15—250.34                    13 Claims

ABSTRACT OF THE DISCLOSURE

A windshield wiper arm construction of the type wherein the arm is pivoted to a mounting head and spring means interconnected between the arm and the mounting head, characterized in that the spring means comprises plural tension springs of reduced dimension positioned lengthwise of the arm providing sufficient biasing force at the end of the arm while affording a low profile to the arm; also characterized in that the springs are connected to a pivoted link having improved bearing surfaces at the connections to the spring and to the mounting head, the link providing a continuously changing lever arm cooperating with the spring means to afford constant wiper arm pressure throughout the full sweep of the arm.

BACKGROUND OF THE INVENTION

Field of the invention

This invention relates to windshield cleaning apparatuses and, more particularly, to an improved windshield wiper arm construction.

Brief description of the prior art

Continuing efforts have been made in automobile design directed particularly to improvements in inherent safety of the vehicle as well as styling refinements. With respect to windshield wiper assemblies, safety dictates that the structure be compact so as not to constitute a visual obstruction, especially during inactivity, and that the wiping patern be as large as possible. Styling dictates that the windshield wiper assembly be compact and preferably obscured from view. Some styling changes have been in the nature of concealing the windshield wiper assembly in its parked or inactive position in a plenum chamber behind a raised cowl portion at the rear of the automobile hood and at the base of the windshield. Of necessity, the windshield wiper assembly must be of low silhouette or profile to fit within this relatively confined area, and to be capable of entry thereto and exit therefrom at the termination and initiation, respectively, of activation of the windshield wiper assembly.

U.S. Pat. No. 3,344,458 shows one attempted solution to satisfy the above-mentioned safety and styling requirements. This patent states that windshield wiper arm construction has utilized tension springs for providing blade biasing pressure toward the windshield, but that the use of larger of these springs in larger windshield wiper assemblies has created obstacles to the effort to conceal the wiper arm or reduce the profile thereof. Thus, this patent proposes that tension springs not be used. Instead, Pat. 3,344,458, teaches that the solution to the problem is to use small compression springs to obtain the desired biasing pressure and also the desired low profile. However, it is believed that this construction has resulted in a windshield wiper assembly wherein there are significant differences in wiper arm biasing pressure appiled to the blade at different stages of the sweep of the blade, thereby resulting in uneven windshield cleaning and thus departing from optimum safety standards. Thus, it has become desirable to provide a windshield wiper arm assembly which will be of low profile yet retain uniform wiping pressure throughout the full wiping sweep of the assembly to maintain high safety standards during operation thereof.

SUMMARY OF THE INVENTION

This invention is dierected, in brief, to the provision of an improved windshield wiper arm construction of the low profile type utilizing tension springs to apply biasing pressure for urging the end of the arm, and a connected blade, against a windshield in wiping engagement therewith.

The best mode currently contemplated for carrying out the invention is the provision of an arm assembly of the type wherein the arm has a box-like channel portion pivoted to a mounting head which is intended to be connected to the windshield wiper pivot shaft of a vehicle, with a plurality of tension springs extending generally lengthwise of the channel section and connected to the arm and mounting head to provide the necessary biasing force at the end of the arm. A link is pivoted at its opposite ends to the mounting head and to the springs below the pivotal connection of the arm to the mounting head. As the tension springs flex during the wiping sweep of the arm assembly, the lever arm between the link and the pivot of the mounting head to the wiper arm decreases, compensating for increased spring pressure and giving a relatively uniform arm biasing pressure throughout the sweep of the assembly.

In the presently contemplated best mode, the link takes the form of a generally U-shaped stirrup or bail with the closed end connected to the spring and provided with a bearing arrangement for guiding relative to and fro movement of the link. The open end of the link has inturned portions pivoted to spaced areas of the mounting head affording a relatively wide bearing surface for widely distributing loads imposed on this connection.

BRIEF DESCRIPTION OF THE DRAWINGS

FIG. 1 is a three-quarter front perspective view of a windshield and adjacent portions of a vehicle utilizing the windshield wiper assembly embodying this invention;

FIG. 2 is an enlarged side perspective view of the windshield wiper assembly shown in FIG. 1;

FIG. 3 is an enlarged broken view of the wiper arm embodying this invention shown in FIGS. 1 and 2;

FIG. 4 is a broken side elevational view of the wiper arm shown in FIG. 3;

FIG. 5 is a fragmentary bottom plan view of the wiper arm of this invention shown in FIGS. 3 and 4;

FIG. 6 is a fragmentary sectional view taken generally along the lines 6—6 of FIG. 3 showing the arm in an extended position relative to a mounting head; and FIG. 7 is a fragmentary view partially in section and generally similar to FIG. 6, but showing the arm in a depressed position relative to a mounting head.

DESCRIPTION OF THE PREFERRED EMBODIMENT

The windshield wiper arm 10 of this invention is shown in use as part of a windshield wiper assembly 12 mounted on a vehicle 14, such as a passenger auto. The wiper assembly includes a blade 16 which is supported by the arm and performs the wiping function during activation of the assembly 12. The assembly 12 is shown as being mounted in a plenum 18 behind the raised cowl 20 at the rear end of a hood 22 and at the base of the windshield 24 of the vehicle 14. The vehicle 14 as shown in the drawings, is of the type wherein the windshield wipers, when in the parked or inactive position, are hidden in the plenum area behind the cowl. During activity, the blade 16 cleans the windshield in a sweeping motion as illustrated by wipe pattern 26, responsive to to and fro actuation of the arm.

The arm 10 includes a channeled section or channel portion 30 which is generally a box-like body having a back 30a and depending side flanges 30b and 30c. A bar-like extension member 32 extends beyond channel section 30 and is secured thereto by suitable means, such as pin 34. A mounting head 36 is pivoted to the channeled section 30 by a pin 38 and includes a splined socket 40 providing a means for connection to the splined head 42 of a pivot shaft 44 of a vehicle 14. When the splined socket and splined heads 40 and 42, respectively, are joined, actuation of the windshield wiper assembly in the well known manner by operation of a suitable switch in the dashboard of the vehicle will cause rotation of the pivot shaft which, in turn, will cause to and fro sweeping movement of the arm to drive the blade 16 through its wipe pattern 26.

A generally U-shaped retaining spring 46 having bent ends 46a which are turned about pin 38 and a mid-portion 46b which extends into the area of the splined socket beyond intermediate wall 48, engages the underside 50 of splined head 42 when the head and socket are assembled to prevent accidental or unintended withdrawal or relative separation of the socket and head.

Recent government standards have dictated the size of the wipe pattern 26 and it has become necessary in some instances to connect blade 16 to arm 10 by means of an articulating connection to satisfy these requirements. The arm assembly shown herein has such an articulated connection including a crank 52 which is secured by a pin 54 to the end of extension 32 and is provided with another pin 56 for securing the crank to a drag link 58 that extends generally parallel to arm 10. The opposite end of drag link 58 from pin 56 is provided with an opening 60 for pivotally mounting the drag link to an eccentrically positioned pin 61 to afford a parallelogram-like movement to the arm assembly 12. A connecting pin 62 on crank 52 provides a means for connecting or receiving blade 16. Generally speaking, all of the elements and components described herein above are generally well known in the art.

During activation of the windshield wiper assembly, the assembly raises from its parked position (shown herein as in the plenum 18 behind cowl 20) to traverse the full extent of its wiping pattern or sweep. The surface of the windshield wiped is, relative to the pivot shaft 44 on which the arm assembly is mounted, a conical segment in the case of curved windshields with which most present vehicles are provided. Thus, the arm assembly movement is pivotal about shaft 44 for the side to side sweep through the wipe pattern 26 and is also pivotal about pin 38 to accommodate the rise and fall occasioned by traversing a relative conical surface during the to and fro sweep through the wiping pattern 26.

Generally speaking, spring means are utilized to urge the arm, and the connected blade, against the windshield. During the wiping or sweeping action, the rise and fall of the arm flexes the spring, changing the biasing force thereof and therefore changing the amount of biasing pressure with which the blade is urged against the windshield. One of the prime considerations for effective wiping action of the blade is uniformity of blade pressure throughout the sweep or wipe pattern. The present invention does provide a means for automatically changing the force exerted by the deformed spring or compensating for spring deformity during wiping action to provide uniform wiping pressure in an arm assembly of low profile.

Complicating the problem of affording a low profile assembly is the increase in length and overall size of the arms and blades to accommodate larger windshields, thus requiring a greater biasing force for effective wiping action. As mentioned in Pat. 3,344,458, increasing the spring size to obtain greater spring force, particularly in the case of tension springs, requires a larger channeled section of the arm assembly to house the larger spring, and this is in direct opposition to the desire for providing a blade of lower profile. The present invention does provide an arm of the type employing tension springs to give increased pressure at the end of the arm for optimum wiping performance with larger arm assemblies while housing the spring structures in a housing of reduced silhouette or lower profile as desired for safety and styling considerations.

To these ends, the arm biasing or urging means of this invention takes the form of a plurality of tension springs 66a and 66b, shown herein as being of the coil spring type, each being of reduced dimension and of reduced strength or biasing force relative to the single spring necessary to provide sufficient biasing force for effective wiping action for an arm of each particular size. However, the two springs conjointly give sufficient biasing force and, when disposed in side-by-side arrangement as illustrated herein, may be housed in a channeled section 30 of the arm assembly of reduced silhouette or lower profile in that the dimension of the masking flanges 30b and 30c may be relatively small or reduced and still adequately shield or mask the springs 66a and 66b. By this arrangement, the desired ends of safety and styling are satisfied in that the arm does have the low silhouette or profile and yet has sufficient wiper biasing force for effective wiping action.

Each spring 66a and 66b is provided with one hooked end 68a and 68b, respectively, each of which is received in a notch 70a and 70b, respectively, of plate 72. Plate 72 is provided with a keyhole opening 74 including enlarged portion 74a through which head 78 of pin 34 may be impaled with subsequent lateral movement of plate 72 causing the shank 76 of pin 34 to be received in the reduced portion 74b of keyhole opening 74 to secure plate 72 to arm 32 and operatively connect the springs 66a and 66b to arm 32 and channeled section 30.

Each spring 66a and 66b is also provided with another hooked end 80a and 80b, respectively, which is connected to the stirrup, bail or generally U-shaped link 82 at the base 84 thereof. The link includes a pair of rearwardly extending legs 85a and 85b, each of which terminates in inturned ends 86a and 86b, respectively. These free ends provide a bearing surface or pivotal connecting means and are received in mating, widely laterally spaced openings or spaced bushings 88a and 88b which face outwardly from opposite sides of the mounting head. Openings 88a and 88b are positioned below and to the rear of a pivotal connection 38 of mounting head 36 with the channeled section 30 of the arm 10. This arrangement provides a means for automatically changing the force exerted by the deformed spring or compensating for spring deformity during wiping action to provide uniform wiping pressure in an arm assembly of low profile.

The springs 66a and 66b and the link 82 establish a means interconnecting the arm and the mounting head to provide the necessary biasing force at the end of the arm for urging blade 16 against windshield 24 during operation of the assembly 12.

The widely spaced ends 86a and 86b of the link afford wide bearing surfaces for increased loads imposed by the operation of heavier arms and stronger springs as the link 82 pivots in the bushings 88a and 88b of the mounting heads. The wider bearing surfaces give less wear to the interconnecting link and by widely distributing the heavier loads imposed thereon, increases the life of the link, and, therefore, the entire arm assembly.

The arm assembly of this invention is further provided with a novel means for guiding the link 82 in its to and fro movement as the springs 66a and 66b flex and contract. Included in this guiding means is a bearing member on the link adjacent to the connection with the spring means, this bearing member taking the form of a block 92 positioned on the base portion 84 of the link, the block in the preferred embodiment being a nylon material impregnated with molybdeum disulfide. The bearing or block 92 has a bearing surface which, in the illustrated embodiment, is a flat face 94. This face is in sliding facial abutment with a similar flat face 95 of the Z-shaped bracket 96. Bracket 96 is secured to the arm by being affixed to and depending from the channel back 30a by means of rivet or pin or fastening means 98. By this arrangement, the bearing surface is generally held in the plane of the arm during the to and fro movement of the link as the spring is flexed. Particularly, this is accomplished by the fact that the guiding or bearing surface 95 of the bracket extends in the direction of the springs. The upstanding portion of a bracket 96 serves as an abutment which tends to limit the travel of the link and the extension of the springs to prevent unintended overextension thereof which might stretch or deform the components beyond their intended limits to a point which would cause damage or destruction thereof.

During operation of the windshield wiper assembly, as previously discussed, the arm rises and falls relative to the mounting head due to the relatively conical surface traversed by the blade through the wiping path. FIGS. 6 and 7 illustrate the extreme positions between the rise and fall of the arm relative to the mounting head. In FIG. 7, the arm is shown fully depressed relative to the mounting head and the spring is in its most retracted position, whereas in FIG. 6, the arm is extended relative to the mounting head and the spring is in its most extended position. The position of the link relative to the pivotal connection of the mounting head and arm is changed with the effective lever arm between the link and pivotal connection 38 being shortened in FIG. 6 where the spring is extended and being lengthened in FIG. 7 wherein the spring is retracted. This change in the length of the effective lever arm compensates for the changes in the biasing force exerted by the spring as it is extended and retracted, thereby lending uniformity to the resultant pressure exerted on the end of the wiper arm or imparted to the blade so that there will be usbstantially uniform pressure throughout all positions of the blade as it traverses the wiping pattern 26.

The foregoing detailed description has been given for clearness of understanding only, and no unnecessary limitations should be understood therefrom, as some modifications may be obvious to those skilled in the art.

I claim:

1. In a windshield wiper assembly including an arm pivoted to a mounting head with spring means interposed between the arm and the mounting head for biasing the end of the arm toward a windshield during operation of the wiper assembly, an improved link arrangement interconnecting the spring means to the mounting head comprising: a link member having one end constructed and arranged for connection to the spring means and the other end constructed and arranged for pivotal connection to the mounting head so that as the spring flexes during operation of the arm assembly, the link will pivot about its connection with the mounting head and, in the area of its connection with the spring, move toward and away from the mounting head; a bearing member on the link adjacent to the connection with the spring means; and a guiding surface on the arm in sliding abutment with the bearing surface and positioned to hold the bearing surface generally in the plane of the arm during to and fro movement of the link as the spring is flexed during operation of the arm assembly.

2. The link arrangement of claim 1 wherein the bearing is a block-like member connected to the link having a bearing face in sliding abutment with the guiding surface.

3. The link arrangement of claim 2 wherein the guiding surface is positioned under the bearing face.

4. The link arrangement of claim 3 wherein the guiding surface is part of a bracket which depends from the arm with the guiding surface generally extending in the direction of the spring means and with an abutment at one end of the guiding surface limiting the travel of the link and the extension of the spring.

5. The link arrangement of claim 4 wherein the link is generally U-shaped having a base with outwardly extending legs with the bearing mounted on the base of the legs.

6. The link arrangement of claim 5 wherein the bearing is a nylon block impregnated with molybdenum disulfide.

7. A windshield wiper arm assembly comprising a mounting head having means for connecting said mounting head on an oscillatable pivot shaft, an arm portion pivoted to the mounting head and spring means connected to the arm portion, said means for connecting the mounting head to the oscillatable pivot shaft being positioned between the pivotal connection of the mounting head to the arm portion and the spring means, and a link member fastened to the spring means and pivotally connected to the mounting head, the pivotal connection of the link to the mounting head being at a point to the rear and below the pivotal connection of the arm to the mounting head.

8. The windshield wiper arm assembly of claim 7 wherein the link is generally U-shaped with the base of the U being connected to the spring means, the free ends of the U are pivotally connected to the mounting head and the legs of the U straddle the means for connecting the mounting head to the oscillatable pivot shaft.

9. The arm assembly of claim 7 wherein a bearing means is mounted on the base of the link and wherein a guiding surface is connected to the underside of the top of the arm and extends below the bearing surface on the link in sliding abutment therewith to guide the link in its relative to and fro movement during expansion and contraction of the springs as the arm assembly is activated to perform a wiping function.

10. A windshield wiper arm assembly having a low profile including an arm portion pivotally connected to a mounting head with spring means interposed between the arm portion and the mounting head for biasing the end of the arm toward a windshield during operation of the wiper assembly, and a link member pivotally arranged at the mounting head, the other end of the link member being coupled to a guide member, said spring means comprising a pair of springs positioned in side-by-side relationship in the plane of the arm portion of the assembly, said link member extending along both sides of the mounting head with one end having portions constructed and arranged for pivotal connection to the mounting head and the other end of the link member being connected to the pair of springs and adapted to pivot and slide with the guide member generally in the plane of the arm portion of the assembly during to and fro movement of the link members as the spring means is flexed during operation of the wiper assembly.

11. The windshield wiper arm assembly of claim 10, characterized in that the guide means coupled to the link member comprises a bearing member on the link member adjacent the connection to the spring means and a guiding surface on the arm in sliding abutment with the bearing member.

12. The windshield wiper arm assembly of claim 11, characterized in that the guiding surface is connected to the underside of the top of the arm.

13. The windshield wiper arm assembly of claim 11, characterized in that the bearing member is a block-like member connected to the link member and has a bearing face in sliding abutment with the guiding surface.

References Cited

UNITED STATES PATENTS

| | | | |
|---|---|---|---|
| 2,264,241 | 11/1941 | Horton | 15—250.34 |
| 3,339,222 | 9/1967 | Bock et al. | 15—250.35 |
| 3,440,679 | 4/1969 | Druseikis | 15—250.34X |

FOREIGN PATENTS

| | | | |
|---|---|---|---|
| 528,654 | 1921 | France | 15—250.34 |

ROBERT W. MICHELL, Primary Examiner

U.S. Cl. X.R.

15—250.35